United States Patent [19]

Anderson

[11] Patent Number: 4,508,059
[45] Date of Patent: Apr. 2, 1985

[54] MILKING BARN
[75] Inventor: Bernard O. Anderson, Glendale, Ariz.
[73] Assignee: Nielsen Industries, Inc., Phoenix, Ariz.
[21] Appl. No.: 578,960
[22] Filed: Feb. 10, 1984
[51] Int. Cl.³ ............................................. A01K 1/12
[52] U.S. Cl. .................................... 119/14.03; 119/27
[58] Field of Search .............................. 119/14.03, 27
[56] References Cited
U.S. PATENT DOCUMENTS
3,448,725 6/1969 Holm et al. ............................ 119/27
3,810,442 5/1974 Jacobs et al. ..................... 119/14.03
3,885,528 5/1975 Vandenberg ...................... 119/14.03
4,419,961 12/1983 Vandenberg et al. ........... 119/14.03

Primary Examiner—Hugh R. Chamblee
Attorney, Agent, or Firm—Charles E. Cates; Victor Myer

[57] ABSTRACT

A herringbone feeding and milking stall is disclosed wherein a vertical feedbowl framework for each cow is rotatable between ingress, milking and egress positions and in so doing the ingress aisle is made wider in the ingress position, is made narrower in the milking position and urges the cow into the milking position and is made on intermediate width in the egress position.

10 Claims, 9 Drawing Figures

INGRESS AISLE
11

MILKING BARN

BACKGROUND OF THE INVENTION

This invention relates to milking barns or parlors, more particularly to the herringbone parlor or barn and it is an object of the invention to provide improved apparatus of this character.

Herringbone milk parlors are well-known to the art. Typical examples thereof are U.S. Pat. Nos. 3,738,320 Holm, 3,885,528 Vandenberg, 4,194,467 Nielsen and Anderson, and 4,362,127 Nielsen and Wallender.

One of the objectives that exists and has existed as typified by the recited patents in the need to economize in space and to decrease the cost of the structures as well as to make them more simple and sturdier. In each of the patents referred to there is a herringbone or zig-zag framework disposed at the rear and the rear side of a cow while at the front end there is a feedbowl arrangement and additional structure for confining each cow in its own stall. The prime objective of all of these structures is to have the cows come into the milking stalls readily, be confined there while the milking is going on, and provide sufficient exit space so that the cows can move out of the stalls without having to follow each other in single file.

Inasmuch as cows come in different lengths and sizes there is always the problem of having the stall fit the cow once the particular animal has moved into place. In the Nielsen et al U.S. Pat. No. 4,362,127 the feedbowls form one end of the stall and the feedbowls are carried by a triangular framework attached to superstructure at the top. The superstructure is adapted to move inwardly and outwardly to decrease and increase the space for the cows to stand in. Such structure is heavy and relatively complicated and thus is expensive. Two gate portions in the Nielsen et al. structure are attached respectively to adjacent feedbowl frameworks and the gate or parts swing open, one clockwise and one counterclockwise to provide the additional space desired for the cow to move out of the stall after milking is completed.

SUMMARY OF THE INVENTION

It is an object of the invention to provide improved herringbone stall apparatus which obviates the disadvantages of the prior art.

The purpose is to speed the milking operation by providing for rapid entering (ingress) as well as rapid exit of the cows (egress). This is accomplished by the novel idea of rotating around its own axis the vertical member or feedbowl frame of the stall to which the necessary gate portions are hinged. One of the many advantages of the invention is that in operation a combination of important functions are accomplished. When the exit lever is actuated and the exit gates begin to open the cows head is pushed away from the feedbowl and directed toward the gate opening. Simultaneously the walkway is widened substantially, thereby providing room for the cow to begin the exit. Further, when the gates are fully opened the feedbowl has been completely removed from the cow by being disposed under a feedbowl cover attached to one of the gate portions.

The required strength and rigidity is maintained throughout the structure by means of a bearing running on a shaft anchored in the concrete floor below and a bearing mounted on a horizontal framework structure above. The top bearing may be provided with a hollow spindle for the feed to drop through and into the feedbowl, thereby combining the feed spout and bearing.

Because the feedbowl frame is pivoted in a bearing at the top and in a bearing in the concrete floor the frame may be made very rugged and strong without using an excess of material as is true with the prior art structures. Also by rotating the feedbowl frame the cow is urged into the milking position when the ingress space is reduced to its smallest value and when milking has been completed rotation of the feedbowl frame increases the space available for the cow to maneuver herself out of the open gates. At the same time the feedbowl itself is rotated out of the cow's accessibility. In the totally open position of the gates also achieved by continued rotation of the feedbowl frame, the ingress space is decreased only a small amount but the gates have been thrown wide open. In this manner efficiency of space is achieved, less material is used as well as other advantages.

It is a further object of the invention to provide a herringbone type milking stall which is efficient in operation, inexpensive to construct and sturdy in operation.

It is a further object of the invention to provide an improved structure of the nature described which is simple in concept.

It is a further object of the invention to provide an improved structure of the nature indicated wherein all of the gates and feedbowl rotations are achieved by a single operating cylinder connected to the operating members by individual operating rods.

It is a further and more specific object of the invention to provide a herringbone milking structure of the nature described which requires less square footage than prior art structures.

In carrying out the invention according to one form there is provided in a herringbone stall at least one pair of adjacent cow stations comprising a zig-zag stationary tail assembly for receiving the rear and side portions of at least two adjacent cows, a vertical feedbowl framework rotatably mounted at the head portion of each adjacent cow station for rotation between ingress, milk, and egress positions, each of the feedbowl frameworks cooperating with a respective one of the adjacent rear portions to form an individual cow stall, the space between the line of the feedbowl frameworks and the rear portions defining an ingress aisle and direction for cows, the space on the opposite side of the line of feedbowl frameworks from the rear portions defining an egress aisle and direction, gate means associated with each of two adjacent feedbowl frameworks for opening and closing the passageways between the ingress and egress aisles, and means forming part of each of the feedbowl frameworks for increasing the width of the ingress aisle in the ingress positions of the feedbowl frameworks and decreasing the width of the ingress aisle in the milk positions of the feedbowl frameworks.

BRIEF DESCRIPTION OF THE DRAWINGS

For a more complete understanding of the invention reference should now be had to the accompanying drawings in which.

DESCRIPTION OF THE PREFERRED EMBODIMENTS

Figure 1:
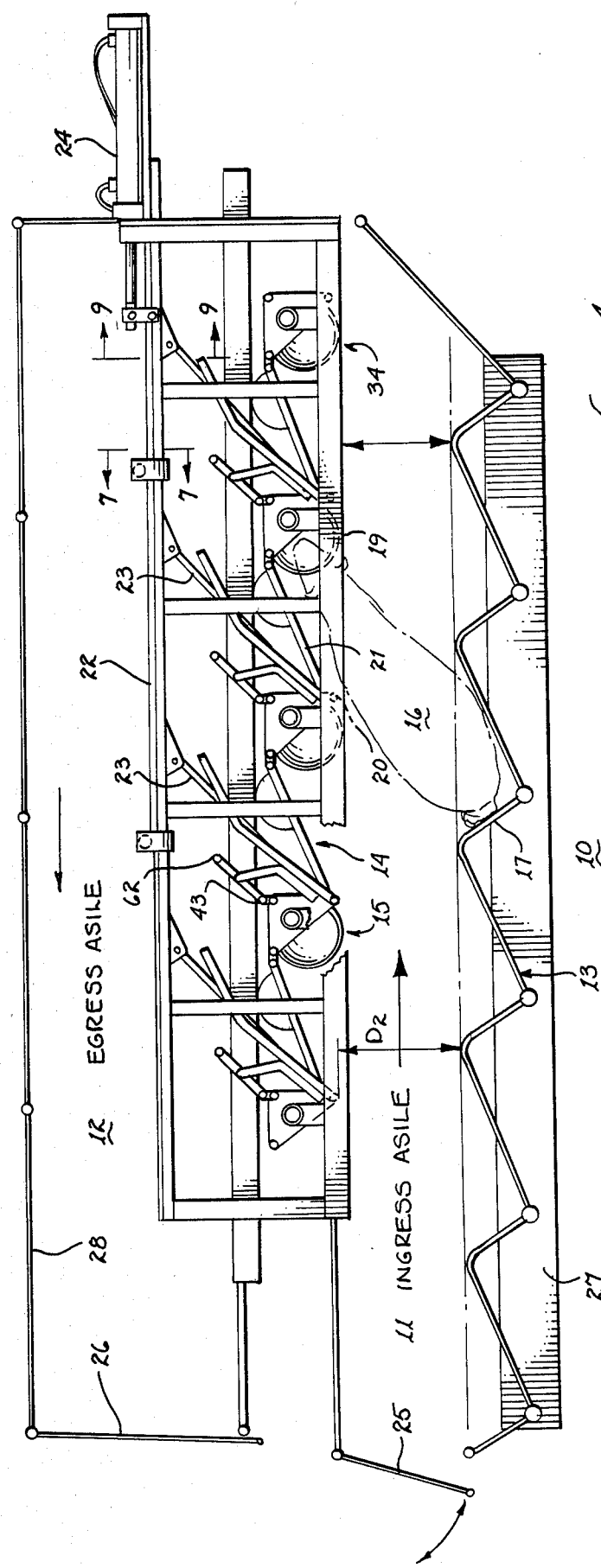
FIG. 1 is a top view, somewhat schematic, of a herringbone milking stall apparatus according to the invention.

Referring to the drawings, the invention is shown as a herringbone milk stall apparatus 10 comprising an ingress aisle 11, an egress aisle 12, a herringbone framework 13 disposed at the rear and the rear sides of a cow, for example, a series of gate structures 14 and a series of feedbowl structures, or frameworks, 15 which together form the operating apparatus of the milk stall apparatus 10. The series of gate structures 14 and the series of feedbowl structures 15 form a divider or separator between the ingress aisle and the egress aisle.

When the cows are in the milking position as may be visualized by the cow 16 in FIG. 1 the rear portions 17 and the rear side portions 18 of the zig-zag or herringbone frame 13 contact the rear end and the rear side of the cow, while the front end of the cow is taken up by the feedbowl or bowls 19 attached to the feedbowl frames 15. The opposite side of the cow is confined by gate member 21 which confines the front and left side of the cow while the vertical portion or member 20 of the feedbowl frameworks is in a position to engage the left shoulder of the cow and urge her into the milking position as will be more particularly described.

It will be observed in FIG. 1 that the left rear portion of the cow is thus available for the milking attendant to attach the teet cups and the like. The vertical member 20 (FIG. 1) has been functional to urge the cow into the position shown with her rear side portion against the portion 18 of the zig-zag framework.

When the gate opens the member 21 and other similar members will pivot clockwise, essentially, and totally out of the way and an auxiliary gate member 35, to be subsequently described, also moves out of the way so that the cow has the full gate area to move through from the ingress aisle and the milking position into the egress aisle. In this process the feedbowl has been pivoted out of the way as will be described. As part of the operation of the structure the feedbowl frames 15 and the feedbowls 19 rotate counterclockwise from a position shown in FIG. 1 to that shown in FIG. 2. However, the feedbowls and frameworks rotate clockwise and the gate member 21 likewise swings essentially clockwise during the change from milk to egress positions, all of this taking place by means of the operation of a single control rod 22 connected by a series of actuating rods 23 to the ends of each of the gate members 21. The control rod 22 is actuatable by a pneumatic or hydraulic cylinder 24 which may be actuated in the usual manner as is well understood.

At the entry to the ingress aisle is a suitable gate 25 which may be of any usual construction and operatable by an attendant, or automatically, or otherwise, through which the cows come into the ingress aisle 11. After the cows have been milked and pass into the egress aisle 12, defined in part by a fence 28, or the like, they pass through a second or exit gate 26 of any usual form, as shown, into the pasture or other location. To the right of the ingress aisle 11 and underneath the zig-zag framework 13 is a splash panel 27 for receiving and otherwise disposing of waste from the cows.

Disposed on the floor underneath the feedbowl frameworks 15 is a floor frame member 29 which may extend the full length of the structure, and is adapted to receive the lower vertical bearings 30 around whose axes the feedbowl frames pivot, or turn. At one end of the floor frame 29 is a transverse frame member 31 to which, at the ingress side of the aisle, is a series of vertical support members 32, and on the egress side of the framework is a series of vertical support members 33. There may be as many of the vertical support members 32 and 33 as are needed in the particular structure.

At the top of the vertical support members 32 and 33 is an upper framework 34 of sufficient rigidity and strength to hold the various components of the operating apparatus as will be described.

Attached to the upper framework 34 is an angular guide 36 in which runs the upper end 37 of gate member 35 attached to gate 21. Similarly attached is a second angular guide member 38 in which runs a follower 39 attached centrally of the upper crossmember of gate 35. As may be seen in FIG. 2 a vertical member 41 of the gate member 35 is pivotally atttached to another corner of the feedbowl framework.

Figure 2:
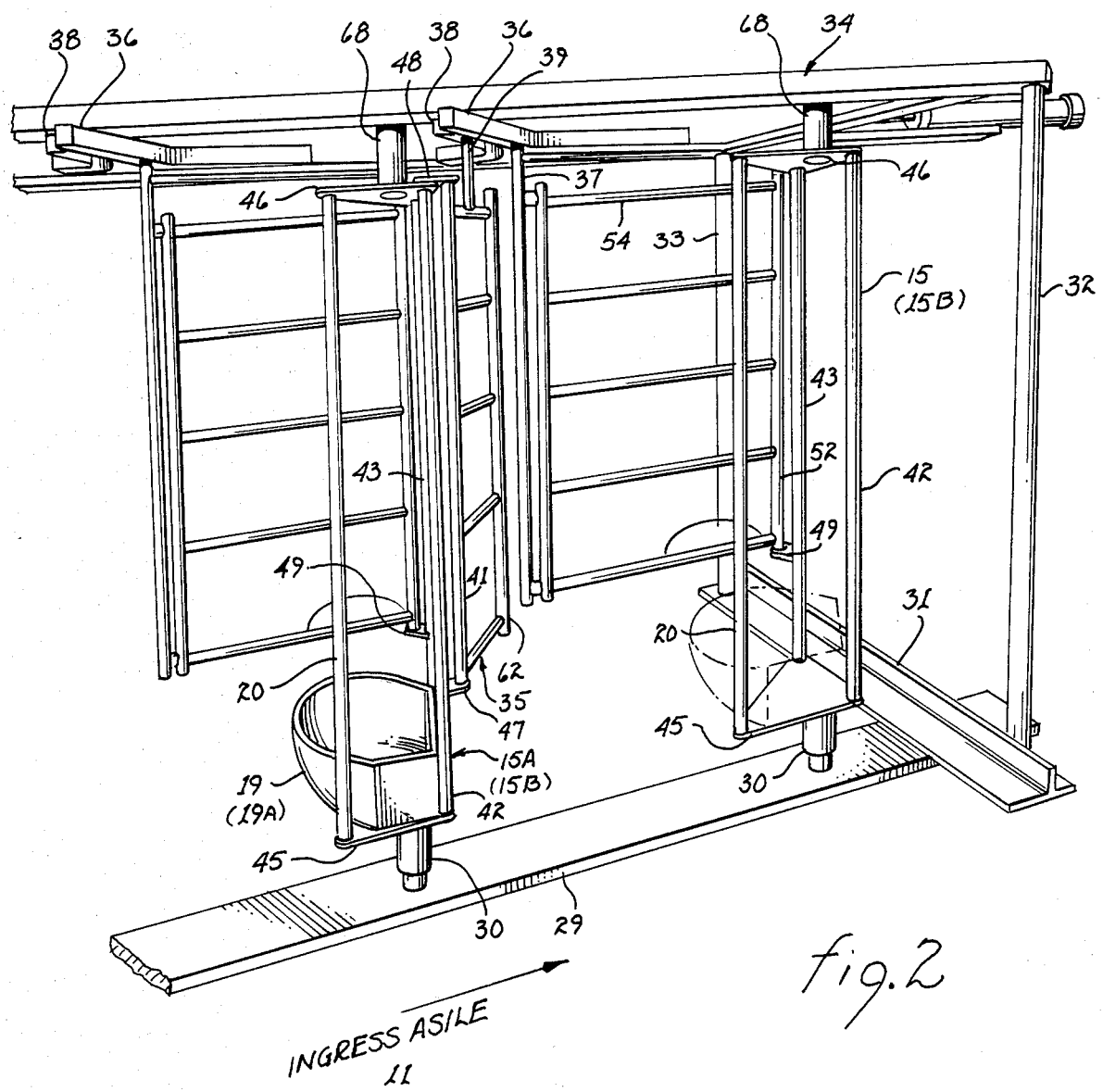
FIG. 2 is a perspective view, somewhat fragmentary, looking toward the front entrance of the apparatus shown in FIG. 1.

FIG. 2 shows that the rods 23 are connected to the gate member 37 and thus when the control rod 22 is pulled or pushed the rods 23 are pulled or pushed thereby, and through the connection with gate members 21, the feedbowl frameworks 15 are rotated either counterclockwise or clockwise as the case may be and as will be more particularly described. Since the feedbowl frameworks 15 rotate, the gate member 35 also rotates in a particular fashion as will be more particularly described.

In describing FIG. 2 the particular feedbowl framework 15A will be described, but it will be understood that all feedbowl frameworks are constructed in essentially the same manner. The feedbowl framework 15B being at the end of the structure does not need to have an auxiliary gate 35 attached thereto, as will be the case for the feedbowl framework 15A. In the position shown in FIG. 2 the feedbowl 19 (19A) is not completely accessible to a cow coming into the stall but is only sufficiently available to provide an inducement for the cow to come into the stall. Thereafter, continued rotation of the feedbowl frame brings the bowl into full operating position as may be seen in FIG. 1.

Each vertical feedbowl framework consists of three vertical members 20, 42 and 43. The bottom ends of the vertical members 20, 42 and 43 are attached, as by welding, to a triangular shaped plate 45, and the upper ends of these vertical members are attached, as by welding, for example to an upper horizontal plate 46.

Attached to, as by welding, to the vertical member 42 is a horizontally extending tab 47, adjacent the bottom of the member, and at the top thereof the member is welded to the plate 46 by means of another tab 48 to which is pivoted the vertical member 42 forming part of auxiliary gate 35. Attached adjacent the bottom of vertical member 43 is a horizontally extending tab 49 and adjacent the top of this vertical member there is attached, as by welding, to the triangular plate 46 a horizontally extending tab 51 (FIG. 6) to which is pivoted the vertical member 52 forming part of the gate 21. The follower member 37 is welded to the gate member 53 forming part of the gate 21 which includes horizontal members 54 which in turn are welded to the vertical members 52 and 53. There is attached by means of extensions 55 the vertical member 53.

The pivots of the vertical member 52, (vertical member 43) the pivots of vertical member 41 (vertical member 42) and the vertical member 20, in effect, form the apices of a triangle which lie on a circle when taking the center of the bearings 35 as a center. This will become evident when considering FIGS. 3, 4 and 5 wherein a phantom circle is shown intersecting these points. Thus it may be considered that the vertical members 20 and 42, 41 form one side 58 of a triangle, the vertical members 42, 41 and 43 form another side 59 of that triangle, and the members 43, 52 and 20 form the third side 61 of that triangle which is a useful manner in viewing the structure for descriptive purposes.

Figure 6:
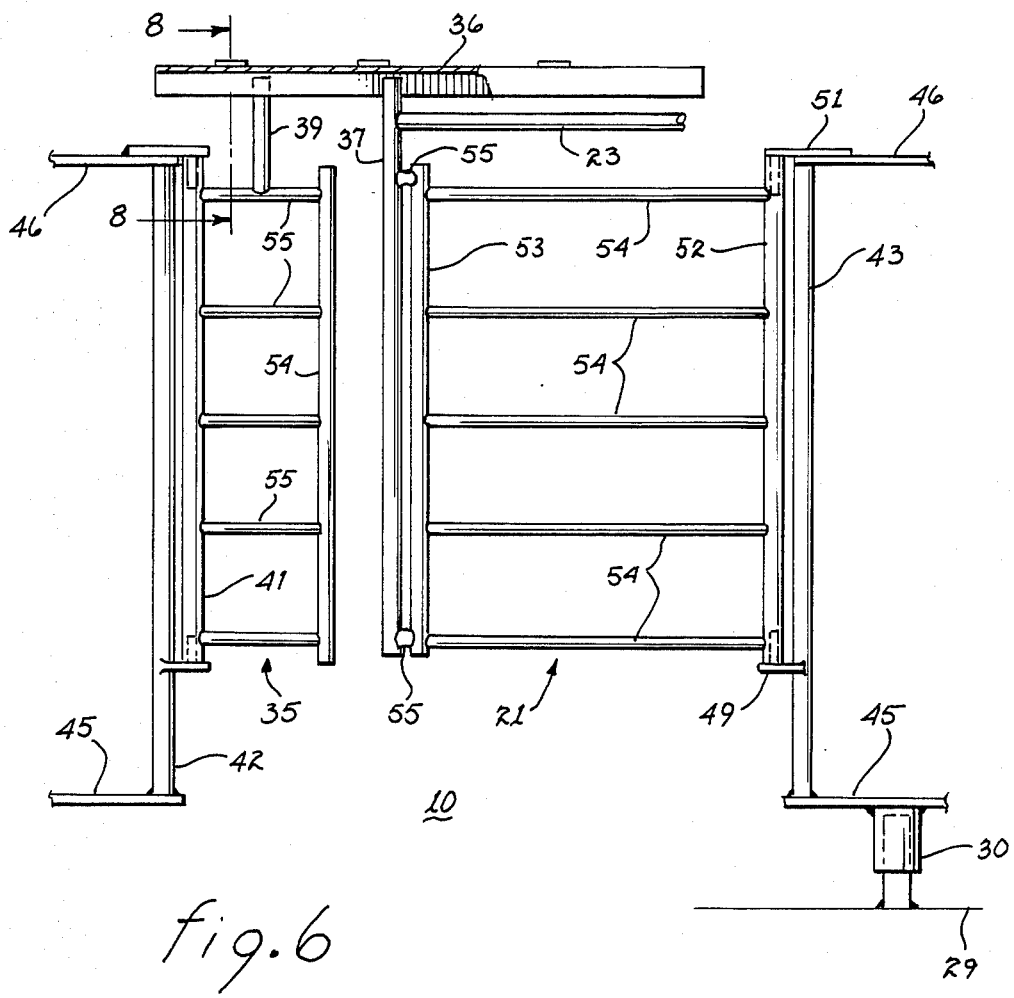
FIG. 6 is a developed elevational view taken substantially in the direction of the arrows 6—6 of FIG. 3.
Figure 8:
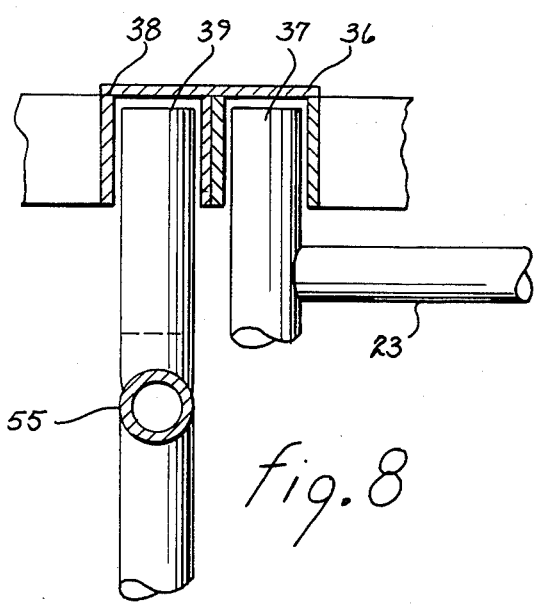
FIG. 8 is a sectional view taken substantially in the direction of the arrows 8—8 of FIG. 6.

Referring to FIG. 6 it will be seen that the upper end of the follower 37 runs in the interior surface of the guide 36. The auxiliary gate 35 in addition to the one vertical member 41 which is the pivotal member, there is a second vertical member 54, the two being connected by a horizontal members 55. The uppermost one of the horizontal members 55 includes the vertical member, or follower, 39 welded thereto, the upper end of which runs in the guide 38 as has been described. The location of the followers 37 and 39 and the guides 36 and 38 may be seen best in FIG. 8.

Figure 3:
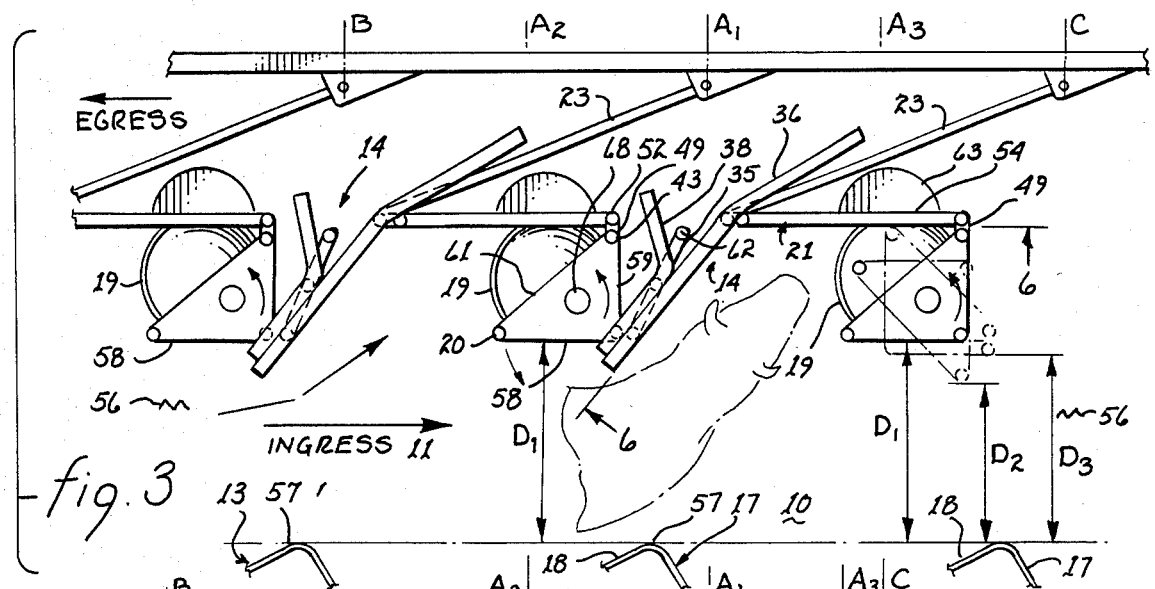
FIG. 3 is a schematic top view showing the operating components in one position, namely, the cow entry or ingress position.
Figure 4:
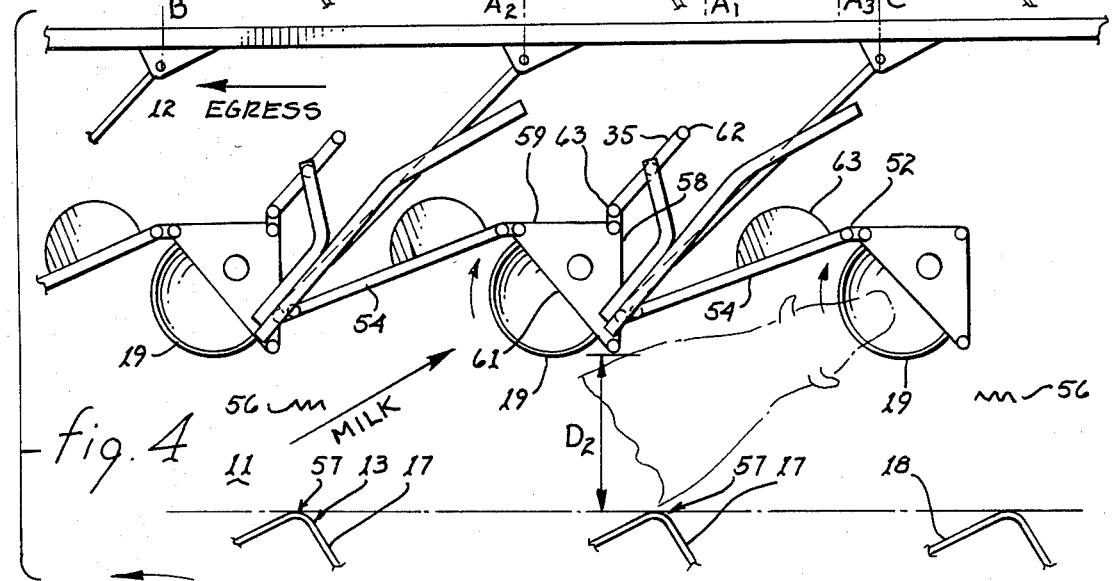
FIG. 4 is a view similar to FIG. 3 showing the location of components in the cow milking position.
Figure 5:
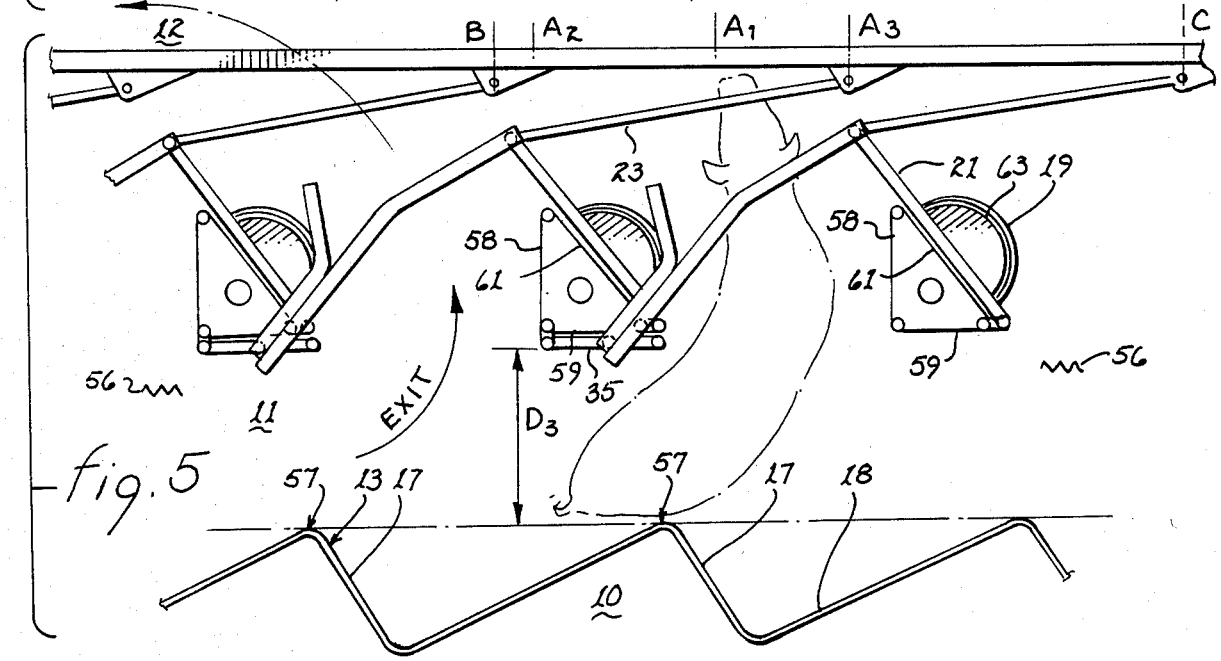
FIG. 5 is a view similar to the preceding two figures showing the components in the cow exit or egress position.

The remaining structure and the operation of the apparatus may best be understood by considering FIGS. 3, 4 and 5 taken in connection with FIGS. 1 and 2. The arrangement of the various parts of FIGS. 1 and 2 are the same as those shown in FIG. 3.

In FIG. 3, the relationship of the zig-zag or herringbone fence 13 is not in precisely the same location as in FIG. 1 and thus the saw tooth lines 56 are shown in FIGS. 3, 4 and 5. FIGS. 1, 2 and 3 show the apparatus in the enter, or ingress, position where cows walk in through the egress aisle 11, i.e., through the space between the apices 57 of the herringbone fence 13 on the one side and the sides 58 of the triangular feedbowl frames, the distance $D_1$. Besides the lines 58 being, in effect, parallel to the ingress direction are at their farthest point from the apices 57 thereby making the distance $D_1$ the largest possible. The cows walk in easily therethrough. The distance $D_1$ in a typical case may be about 36 inches.

As the cows walk in through the ingress aisle 11 each one sees the partially exposed feedbowl 19 and the food therein. Thus each one naturally turns in toward that feedbowl in order to get at the food. The left hand side of the cow, facing toward the feedbowl, is relatively close to the triangle side 58 as the cow is turning toward the closest feedbowl. The gate 21 prevents the cow from moving any farther out towards the egress area 12 and the auxiliary gate 35 having its outer vertical member 62 closely adjacent the end of vertical member 37 of gate 21 there is no room for the cow to go out. So she stays in the space provided with her nose attempting to get at the food in the feedbowl. When all of the cows are in their appropriate locations, that is, one cow in each stall with its nose trying to get at the feed in the feedbowl, the attendant actuates the cylinder 24. This causes the actuating rod 22 to move toward the left from the position shown as $A_1$ in FIG. 3 to the position shown as $A_2$ which is the position shown in FIG. 4.

It is to be noticed that the side 58 of the triangle instead of being parallel to the ingress direction is now perpendicular thereto (a rotation of ninety degrees) and the vertical member 20 has moved approximately ninety degrees counterclockwise to the position shown in FIG. 4. In so doing, the vertical member 20 has engaged the side of the cow adjacent it and has urged her to move over toward the long side 18 of the zig-zag frame with her rump against the short side 17 of this same frame. The distance from the triangle of the feedbowl frame and the line of the apices 57 of the zig-zag or herringbone frame has now decreased to the distance $D_2$ as may be seen comparatively in FIG. 3. The distance $D_2$ is about six inches less than the distance $D_1$ by virtue of the fact that the corner of the triangle is at a greater distance from the center than the distance to a side as will be understood.

The vertical member 20 having contacted the side of the particular cow and urged her into the milking position, she is now in position for further action. At the same time the members 54 of the gate 21 have had the followers 37 follow along the inner portion of the guide 36 until the particular member 54 occupies the slightly angular position as shown in FIG. 4. Thus the member 54 and similar members of the gate 21 are against the relatively close to and perhaps actually against the side of the cow in the milking position which is that of FIG. 4. The cow now being confined between the members 54 and the short and long spaces respectively 17 and 18 of the herringbone frame, milking can take place. As will be seen in FIG. 4 the feedbowls 19 are now fully exposed to the cow's mouth. During this same movement (FIG. 3 to FIG. 4) the corner (vertical member) 62 of the auxiliary gate 35 has been pivoted around by the movement of the triangular feedbowl frames so that the auxiliary gate 35 now occupies the position shown in FIG. 4, is completely out of the way, and does not provide any function at this stage. The feedbowl cover which is a relatively semicircular plate 63 welded to the bottom rung of the gate 21 points away from the feedbowl and does not interfere with its use.

The rotation of the feedbowl frames as between FIGS. 3 and 4 is ninety degrees counterclockwise.

After all of the cows are finished being milked and it is desired to release them from the milking position into the egress aisle 12 the attendant actuates the cylinder and piston 24 causing the control rod 22 to move toward the right to the position shown at $A_3$ in FIG. 3, 4 and 5. This is a movement toward the extreme right in these figures and causes the gate member 21 to be moved to the position shown in FIG. 5 which involves a rotation of the feedbowl triangle in the clockwise direction of one hundred eighty degrees. In this position, the distance from the side 59 of the triangle to the line of the apices 57 of the zig-zag frame is $D_3$ which is only slightly less than the distance $D_1$ as may be seen in FIG. 1. In fact the distance $D_3$ is less than the distance $D_1$ by the length of the tabs 47 and 48 which determine the location of the horizontal members of the gate 35. This diminution of distance is not significant because the cow is moving out through the space provided by the open gate 21 and also the open gate 35. As may be seen in this figure, the gate 35 lies parallel to the side of the triangle 59 and since the cow is in the space between adjacent feedbowl frames the location of this gate does not diminish the needed space.

In the position shown in FIG. 5 it will be seen that the feedbowl cover 63 lies directly over the feedbowl 19 and thus makes it unavailable to any cows in the vicinity. In moving from the position shown in FIG. 4 to that in FIG. 5 it will be observed that, as the feedbowl 19 rotates clockwise, it tends to move the cows face away from the feedbowl and towards the direction of the gate 21. The vertical member 20 of the feedbowl frame accentuates this effect and the cow's face is effectively turned to move toward the egress area.

Instead of the horizontal members 54 and 55 on the gates, or in addition to, short metal plates or panels may be used on the gates.

Figure 9:
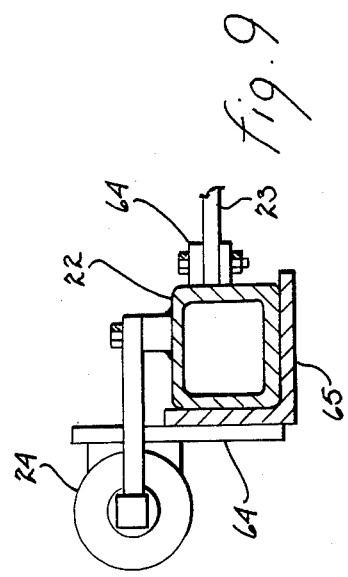
FIG. 9 is a sectional view taken substantially in the direction of the arrows 9—9 of FIG. 1.

The structure for the operating cylinder 24 is shown in FIG. 9 and includes vertical framework member 64 with a supporting angle iron member 65 welded thereto. The operating rod 22 lies in the bite of the angle member 65 and the actuating rod 23 is attached to the operating rod 22 by any suitable means such as a clevis 66.

Figure 7:
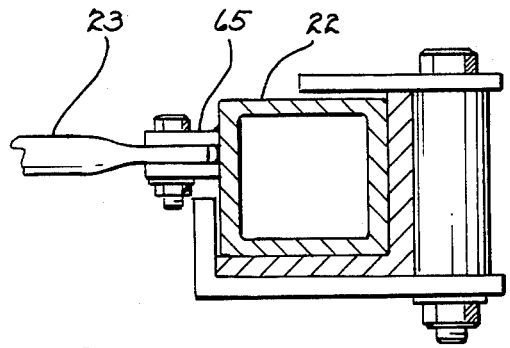
FIG. 7 is a sectional view taken substantially in the direction of arrows 7—7 of FIG. 1.

In FIG. 7 the push rod 23 is shown connected by the same clevis 65 to the operating rod 22.

The upper triangular plate 46 may have holes or openings 67 therein and the upper bearings 68 may be hollow so that animal food may pass through the opening 67, and drop into the feedbowls below.

The bearing members 68 are welded, for example, to the triangular plates 46 and to the supporting super structure. The axis of bearings 68 is the same as that of the lower bearings 30 so that the feedbowl framework can rotate as described.

The bearings are shown as sleeve bearings for simplicity and ruggedness. Other forms may be used. In the bearings and in guides nylon or other synthetic materials may be used to reduce friction.

It will be evident that only one form of the invention has been disclosed and that many variations may be made without departing from the scope and spirit of the disclosure.

I claim:

1. In a stall at least one pair of adjacent cow stations comprising, a tail assembly for receiving the rear portions of at least two adjacent cows,
   a vertical feedbowl framework rotatably mounted on a fixed axis at the head portion of each adjacent cow station for rotation between ingress, milk, and egress positions,
   each of said feedbowl frameworks cooperating with a respective one of said adjacent rear portions to form an individual cow stall,
   the space between the line of said feedbowl frameworks and said rear portions defining an ingress aisle and direction for cows,
   the space on the opposite side of said line of feedbowl frameworks from said rear portions defining an egress aisle and direction,
   gate means associated with each of two adjacent feedbowl frameworks for opening and closing the passageways between said ingress and egress aisles for each particular station,
   and means forming part of each of said feed bowl frameworks for increasing the width of said ingress aisle in the ingress positions of said feedbowl frameworks and decreasing the width of said ingress aisle in the milk positions of said feedbowl frameworks.

2. The stall according to claim 1 wherein the stall comprises a herringbone stall, and the tail assembly comprises a zig-zag stationary structure for receiving the rear and side portions of at least two adjacent cows.

3. In a herringbone stall at least one pair of adjacent cow stations comprising, a tail assembly for receiving the rear portions of at least two adjacent cows,
   a vertical feedbowl framework rotatably mounted on a fixed axis at the head portion of each adjacent cow station for rotation between ingress, milk, and egress positions,
   each of said feedbowl frameworks cooperating with a respective one of said adjacent rear portions to form an individual cow stall,
   the space between the line of said feedbowl frameworks and said rear portions defining an ingress aisle and direction for cows,
   the space on the opposite side of said line of feedbowl frameworks from said rear portions defining an egress aisle and direction,
   gate means associated with each of two adjacent feedbowl frameworks for opening and closing the passageways between said ingress and egress aisles for each particular station,
   means forming part of each of said feed bowl frameworks for increasing the width of said ingress aisle in the ingress positions of said feedbowl frameworks and decreasing the width of said ingress aisle in the milk positions of said feedbowl frameworks,
   said tail assembly comprises a zig-zag stationary structure for receiving the rear and side portions of at least two adjacent cows, and each of the feedbowl frameworks comprises three vertical members disposed essentially at the corners of a triangle, a pair of bracing members holding said vertical members together at each end thereof and bearing members attached to said bracing members disposed interiorly of said corners of said triangle.

4. The stall according to claim 3 wherein in the ingress position of said feedbowl framework a first one and a second one of said vertical members comprise a line parallel to the ingress direction and define the first and the second of said corners, said second one and a third one of said vertical members comprise a line perpendicular to said ingress direction and define a second and third of said corners, and said third one and said second one of said vertical members comprise a feedbowl entrance line and define the third and first of said corners.

5. The stall according to claim 4 wherein the line of said first and second corners in the ingress positions defines the greatest width opening of said ingress aisle, and rotation of said feedbowl frameworks effects movement of said first corner to decrease the width of the ingress aisle and engages the side of a cow occupying the stall.

6. The stall according to claim 4 wherein said gate means comprises an elongated member pivotally attached at one side to said third corner of the one of said feedbowl frameworks of a certain stall, a decreased length member pivotally attached to said second corner of the one of said feedbowl frameworks of the immediately adjacent stall, and means for actuating said gate means between said opening and closing positions.

7. The stall according to claim 6 wherein said gate means includes a first guide member receiving the other end of said elongated member, a second guide member, a pivot member attached to said decreased length member received in said second guide member, and said gate actuating means comprises a linearly movable member adapted for manual or pneumatic operation, and a series of links from connecting said movable member to said other ends of each of the elongated members of said gates.

8. The stall according to claim 7 wherein said first guide member comprises a track having a bend therein whereby said elongate member is held essentially parallel to the ingress direction in the ingress position of the feedbowls, is held proximately parallel to the side of a cow in the milk position and forming part of the stall thereat, and is held in a remote location in the egress position of the feedbowls, and said second guide member comprises a track having a bend therein, whereby said decreased length member is held with its free end adjacent the other of said elongate member in the ingress position, is held in a remote position in the milk position and is held alongside and parallel to said line parallel to said ingress direction.

9. The stall according to claim 8 including a feedbowl attached to the feedbowl side of the feedbowl frame.

10. The stall according to claim 9 including a feedbowl cover attached to the elongate member.

* * * * *